United States Patent [19]
Hughes et al.

[11] Patent Number: 5,756,659
[45] Date of Patent: May 26, 1998

[54] METHOD OF IMPROVING THE OXIDATIVE THERMAL STABILITY OF ETHYLENE POLYMERS

[75] Inventors: Morgan M. Hughes, Angleton; Michael E. Rowland, Lake Jackson, both of Tex.; Chad A. Strait, Clinton, Tenn.

[73] Assignee: The Dow Chemical Company, Midland, Mich.

[21] Appl. No.: 326,981

[22] Filed: Oct. 21, 1994

Related U.S. Application Data

[63] Continuation of Ser. No. 169,716, Dec. 17, 1993, abandoned, which is a continuation of Ser. No. 935,678, Aug. 25, 1992, abandoned, which is a continuation of Ser. No. 663,995, Mar. 4, 1991, abandoned.

[51] Int. Cl.$^6$ .................................................. C08F 6/28
[52] U.S. Cl. ......................... 528/501; 528/483; 528/495; 528/489; 528/497; 528/499; 528/500; 528/502 C
[58] Field of Search .................................. 528/483, 489, 528/495, 497, 499, 500, 501, 502 C

[56] References Cited

U.S. PATENT DOCUMENTS

| | | | |
|---|---|---|---|
| 3,156,009 | 11/1964 | Alsys | 18/12 |
| 3,476,736 | 11/1969 | Kahre | 260/93.7 |
| 3,799,234 | 3/1974 | Skidmore | 159/2 |
| 3,799,235 | 3/1974 | Moosavian et al. | 159/3 |
| 3,917,507 | 11/1975 | Skidmore | 159/2 |
| 3,992,500 | 11/1976 | Kruder et al. | 264/102 |
| 4,029,300 | 6/1977 | Morishima et al. | 425/203 |
| 4,094,942 | 6/1978 | Nakai et al. | 264/102 |
| 4,107,422 | 8/1978 | Salmon | 528/502 |
| 4,265,547 | 5/1981 | Martin | 366/79 |
| 4,578,455 | 3/1986 | Pipper et al. | 528/501 |
| 4,690,981 | 9/1987 | Statz | 525/221 |
| 4,820,463 | 4/1989 | Raufst | 264/62 |
| 4,909,898 | 3/1990 | Padliya et al. | 528/502 |
| 4,921,678 | 5/1990 | Raufast | 422/110 |
| 4,944,906 | 7/1990 | Colby et al. | 528/501 |
| 4,952,672 | 8/1990 | Moore et al. | 528/481 |
| 4,958,006 | 9/1990 | Bernier et al. | 528/50 |
| 4,966,810 | 10/1990 | Strait et al. | 428/335 |
| 4,990,574 | 2/1991 | Yamada | 525/371 |
| 5,003,001 | 3/1991 | Hasenbein et al. | 528/481 |
| 5,071,950 | 12/1991 | Borho | 528/483 |
| 5,080,845 | 1/1992 | Herrmann et al. | 264/101 |

FOREIGN PATENT DOCUMENTS 61-25 22 04 A 11/1986 Japan.

OTHER PUBLICATIONS

H. Wobbe, *Comparison of the Degassing Efficiencies of Single–Screw and Twin–Screw Extruders*, Translated from Kunstoffe 78,(1988).

Joseph A. Biesenberger, *Polymer Melt Devolatilization: On Equipment Design Equations*, Advanced in Polymer Technology, vol. 7, No. 3, pp. 267–278, (1987).

(List continued on next page.)

*Primary Examiner*—Thomas R. Weber

[57] ABSTRACT

A method of improving the oxidative thermal stability of ethylene polymers is disclosed. The method comprises removing residual unreacted monomer(s), solvent and thermally unstable species from the molten polymer. The resulting polymer is characterized by having an oxidative exotherm of not more than about 50 percent of the original polymer, as measured by differential scanning calorimetry.

28 Claims, 2 Drawing Sheets

POLYMER FLOW

OTHER PUBLICATIONS

Vincent James Notorgiacomo Jr., *A Comparative Study of Single vs. Twin Screw Devolatilizers*, A Thesis for the Degree of Master Engineering at Stevens Institute of Technology, (1987).

James L. White et al., *Twin Screw Extruders: Development of Technology and Anlaysis of Flow\**, Advances in Polymer Technology, vol. 7, No. 3, pp. 295–332, (1987).

Martin H. Mack, *Choosing an Extruder for Melt Devolatilization*, Plastic Engineering, pp. 47–51, (Jul. 1986).

Martin H. Mack, *Degassing of LDPE and Co–Polymers Using a Single Screw Devolatilizing Extruder*, ANTEC, Paper #455, (1982).

Hans Werner and John Curry, *Efficient Use of Extruders for Polymer Devolatilization*, Society of Plastics Engineers, 39th ANTEC, pp. 623–626, (1981).

Dieter Gras, *The Use of Multi–Screw Extruders for Devolatilizing Low Solids Polymer Solutions*, Society of Plastics Engineers, 33rd Annual Technical Conference, vol. 21, pp. 386–389, (1975).

David B. Todd, *Polymer Devolatilization*, Society of Plastics Engineers, 32nd Annual Technical Conference, pp. 472–475, (1974).

Dieter Gras, *Advances in Devolatilizing Extrusion Techniques*, Society of Plastics Engineers, 31st Annual Technical Conference, vol. 19, pp. 263–268, (1973).

E. Uhland, *Degassing of Thermoplastics During Extrusion with Single and Twin–Screw Extruders*, Publication by Berstoff Corporation, pp. 1–17, (unknown publication date).

5,756,659

METHOD OF IMPROVING THE OXIDATIVE THERMAL STABILITY OF ETHYLENE POLYMERS

RELATED APPLICATION DATA

This application is a continuation of Ser. No. 08/169,716, filed Dec. 17, 1993, now abandoned, which is a continuation of Ser. No. 07/935,678, filed Aug. 25, 1992, now abandoned, which is a continuation of Ser. No. 07/663,995, filed Mar. 4, 1991, now abandoned.

FIELD OF THE INVENTION

This invention relates to a method of improving the taste and odor properties and the oxidative thermal stability of thermoplastic homopolymers and/or interpolymers of ethylene in the presence of oxygen by removing residual unreacted monomer(s), solvent and thermally unstable species. The resultant polymer is more oxidatively thermally stable and has an oxidative exotherm of not more than about 50% of the oxidative exotherm of the first polymer, as measured by differential scanning calorimetry. This method of improving oxidative thermal stability is especially effective for ethylene/acrylic acid interpolymers.

BACKGROUND OF THE INVENTION

Traditional extrusion devolatilization methods using ordinary vacuum equipped extruders are generally insufficient in removing unreacted residual monomer and other low molecular impurities from the molten polymer to a sufficient degree to improve the oxidative thermal stability of the polymer. When they are not removed, unreacted residual monomer and low molecular impurities also give rise to taste and odor deficiencies in the polymers, which limit the utility of the polymer in food contact applications.

U.S. Pat. No. 4,094,942 (Nakai et al.), incorporated herein by reference, discloses a method for removing unreacted monomer from an ethylene polymer during pelletization by injecting water or steam into the nose portion of the mixing section of an extruder, intermixing the polymer with the water or steam and removing the unreacted monomer and water or steam using vacuum of 500 mm Hg absolute or less. Nakai et al. teach that products thus produced have increased commercial value with respect to odor, but does not teach or suggest how to improve the taste performance or thermal stability of the polymer.

Thermal stability of such polymers is important because they are thermally processed at elevated temperatures where they are subject to accelerated degradation and/or cross-linking, especially in the presence of oxygen. Oxidative thermal degradation of ethylene polymers can cause gel formation and loss of physical properties in the processed polymers (e.g., poorer extrusion performance (such as neck-in and lower line speeds in extrusion coating) and reduced optical properties (such as haze and gloss or even color)), in addition to poor taste and odor properties from the oxidative by-products formed during processing.

Antioxidants (e.g., organic phosphites and hindered phenols) have been added to various polymers, including polyethylene, to improve their thermal stability. However, antioxidants can have deleterious side effects, e.g., color formation, and they can also create food contact problems in themselves, thus negating the benefits of otherwise improved oxidative thermal stability.

The taste and odor performance and the oxidative thermal stability of thermoplastic polymers continue to be areas of commercial need.

SUMMARY OF THE INVENTION

A method of improving the taste and odor properties and the oxidative thermal stability of thermoplastic ethylene polymers has now been discovered. The novel method comprises removing residual unreacted monomer or monomers, solvent and thermally unstable species from a first ethylene polymer, thereby forming a second more oxidatively thermally stable ethylene polymer having an oxidative exotherm of not more than about 50 percent of the oxidative exotherm of the first polymer, as measured by differential scanning calorimetry. The novel method comprises utilization of an extruder having at least two devolatilization zones and designed such that each devolatilization zone is operated as a partially-filled zone with no more than 75 percent by volume based on the total volume of the zone of a molten polymer.

The novel method is particularly useful in improving the taste and odor properties and the oxidative thermal stability of ethylene/acrylic acid interpolymers which are widely used in the food packaging industry in single or multilayer laminate film structures for food wraps, beverage containers or condiment pouches.

DETAILED DESCRIPTION OF THE DRAWINGS

Figure 1:
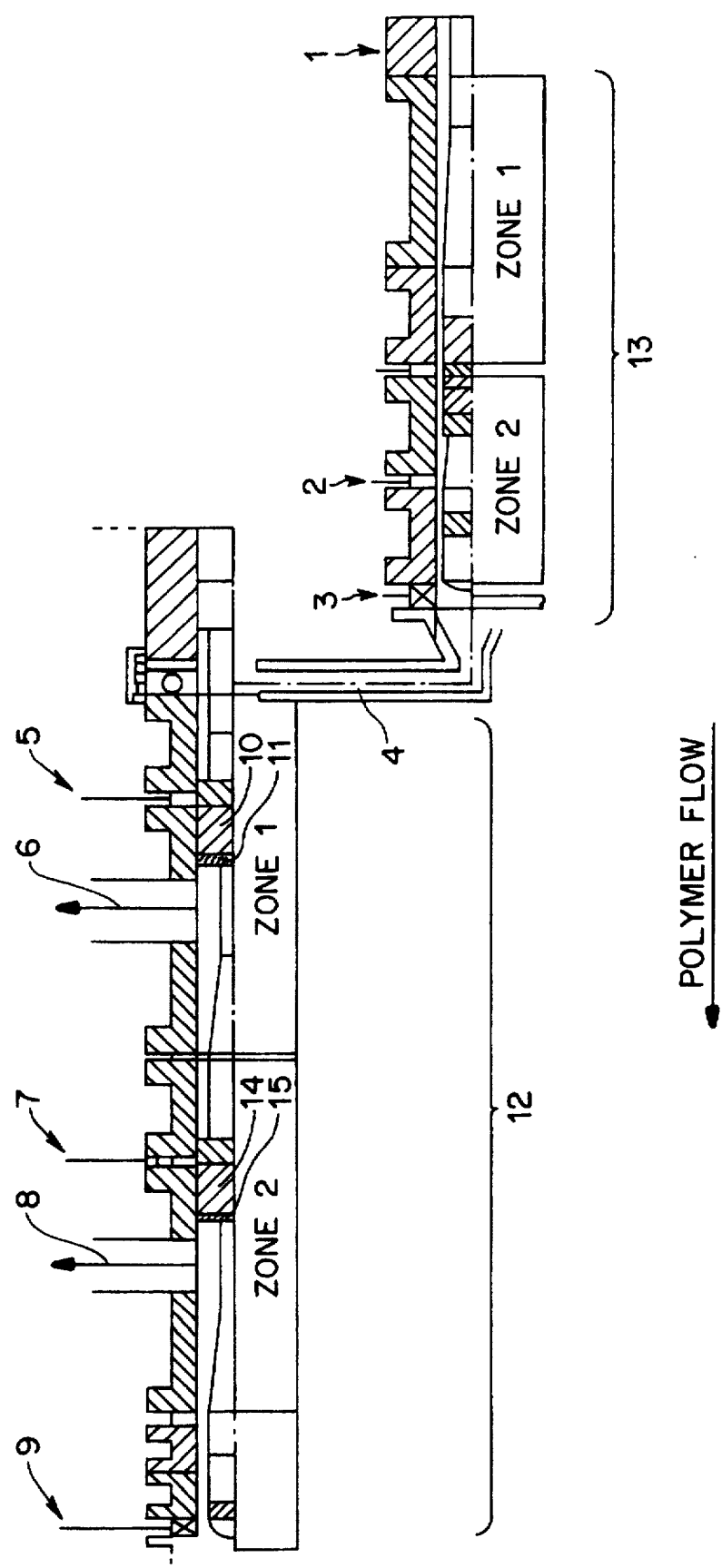
FIG. 1 schematically shows an extrusion system comprising two single screws which can be used to improve the oxidative thermal stability of ethylene polymers.

FIG. 1 schematically shows the cross-section of an extrusion system comprising two single screws useful for improving the oxidative thermal stability of ethylene polymers, as disclosed in Comparative Examples 1–3 and Example 4 below. In FIG. 1, the polymer is fed into the feed section (1) of a first extruder system (13) and is melted and conveyed into zone 1 by a screw. The temperature of the entire extruder system is controlled by a hot oil system (not shown). Ethylene (as a stripping agent) is injected into zone 2 through a port (2). The melt temperature of the first extruder is monitored by means of a thermocouple (3). A transfer line (4) is used to transfer the polymer/ethylene mixture to a second extruder system (12). Preferably, the screw in the first extruder operates at slower revolutions per minute (rpm) than the screw in the second extruder such that the feed to the second extruder is less than that required to fill the screw channels (i.e., the second extruder is "starve fed"). A first injection port (5) is used to inject an additional stripping agent into the polymer melt stream in the second extruder and the polymer/ethylene/additional stripping agent mixture is conveyed into a mixing zone (10). The polymer/ethylene/additional stripping agent mixture is temporarily confined and controlled within the mixing area by a melt seal (11) and the compression side (up-stream side) of the screw. The polymer/ethylene/additional stripping agent mixture flows past the melt seal (11) and into the first vacuum port area (6). Vacuum is applied to the first vacuum port (6) and the stripping agent, the unreacted monomer(s), residual solvent and residual thermally unstable species are partially devolatilized. The polymer then enters a second compression zone and an effective melt seal is formed. A second injection port (7) is utilized to inject a second stripping agent into the polymer melt stream, immediately followed by a mixing zone (14), and a melt seal (15). The polymer/ additional stripping agent mixture is temporarily confined between the melt seal and the compression side (up-stream side) of the screw to ensure adequate mixing. A second vacuum port (8) is used to remove additional stripping agent, unreacted monomer(s), residual solvent and residual thermally unstable species, thus forming a polymer with greater oxidative thermal stability. A melt thermocouple (9) monitors the temperature of the exiting melt stream.

Figure 2:
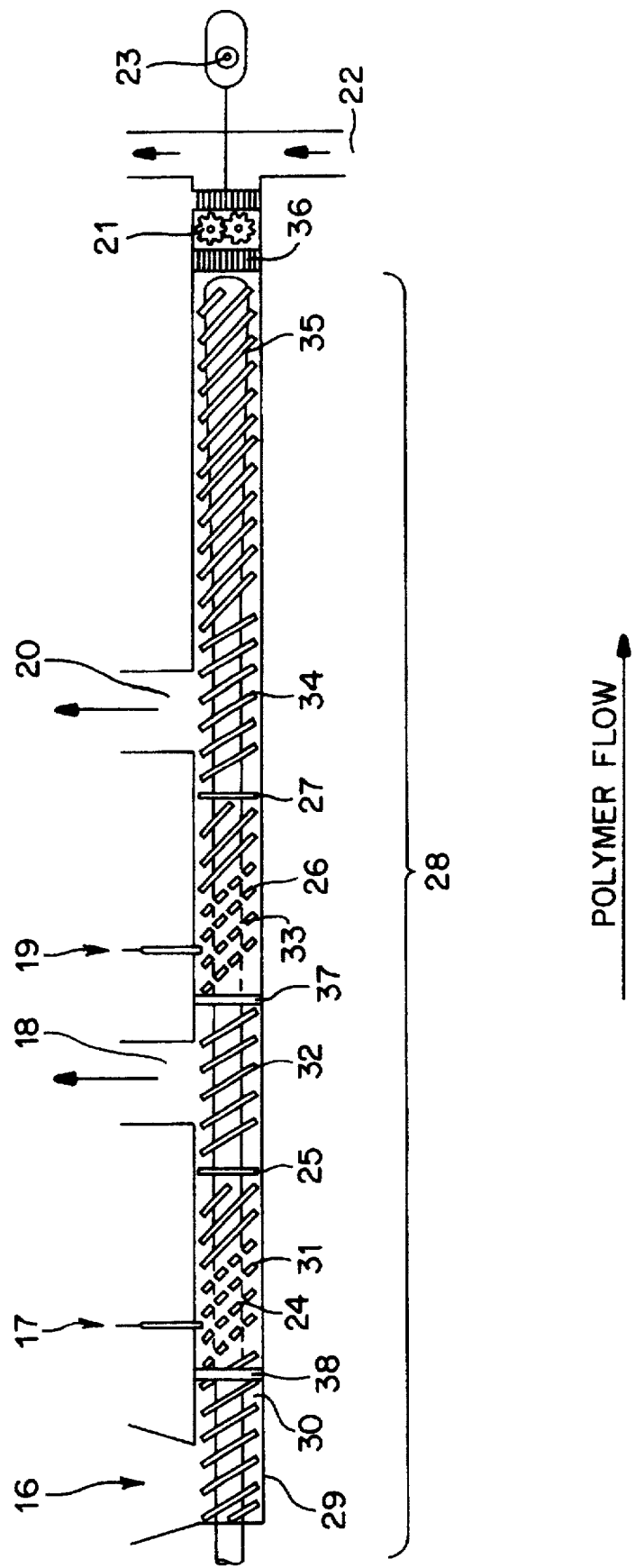
FIG. 2 schematically shows a twin screw extrusion system which can be used to improve the oxidative thermal stability of ethylene polymers.

FIG. 2 schematically shows the cross-section of a co-rotating twin screw extrusion system useful for improving the oxidative thermal stability of ethylene polymers, as disclosed in Comparative Examples 5–7 and Example 8 below. In FIG. 2, the polymer is fed into the feed section (16) of a twin screw extruder system (28) and is melted and conveyed into zone 1 by two intermeshing screws. The temperature of each extruder zone is controlled by a temperature controller and resistance heaters (not shown). The temperature of the extruder is monitored by means of a series of thermocouples (29–36). Preferably, the feed to the extruder is controlled such that it is less than that required to fill the screw channels of the devolatilization zone (i.e., the vacuum zone of the extruder is partially filled). A first injection port (17) is used to inject a first stripping agent into the polymer melt stream and the polymer/stripping agent mixture is homogenized in a mixing zone (24). The mixed polymer/stripping agent mixture is temporarily confined and controlled within the mixing area by two melt seals (38, 25). The polymer/stripping agent mixture flows past the melt seal (25) and into the first vacuum port area (18). Vacuum is applied to the first vacuum port (18) and the stripping agent, unreacted monomer(s), residual solvent and residual thermally unstable species are partially devolatilized. A second melt seal (37) separates the first vacuum zone from a second stripping agent injection port (19). The second injection port (19) is utilized to inject a second stripping agent into the polymer melt stream, immediately followed by a mixing zone (26), and a melt seal (27). The mixed polymer/stripping agent mixture is temporarily confined and controlled within the mixing area by two melt seals (37, 27). The polymer/ stripping agent mixture flows past the melt seal (27) and into the second vacuum port area (20). The second vacuum port (20) is used to remove additional unreacted monomer(s), residual solvent and residual thermally unstable species, thus forming the more oxidatively thermally stable polymer. A motor (not shown) drives a gear pump (21) which pumps the thermally stable polymer into a pelletizer (23) which chops the more thermally stable polymer into pellets. A liquid stream (22) cools and solidifies the polymer into pellets. The cooling liquid stream conveys the chopped/ pelletized polymer to a separation point (not shown) where the liquid is separated from the polymer pellets and, optionally, is recycled back through the process.

DETAILED DESCRIPTION OF THE INVENTION

The novel devolatilization method of the present invention is useful for improving the taste and odor of various thermoplastic ethylene polymers, including homopolymers or interpolymers of ethylene with alpha-olefins or substituted alpha-olefins.

Homopolymers of ethylene for use in the present invention include homopolymers of ethylene made using a high pressure, free radical generating process and are generally known as low density polyethylene. Low density polyethylene (LDPE), also known as High Pressure Polyethylene and historically as ICI-type polyethylene, is a branched ethylene homopolymer made using free radical polymerization techniques under high pressures. The ethylene is randomly polymerized into the polymer chains and forms numerous branch points. The density of LDPE is dictated by the degree and length of branches and is typically in the range of 0.910–0.925 grams per cubic centimeter (g/cc). The molecular weight of the LDPE is indicated by melt index (MI) as measured using ASTM D-1238 (E) (190° C./2.16 kilograms). The MI range for LDPE for use in the present invention can be from about 0.01 to about 1000 grams/10 minutes, preferably 0.1 to 100.

Linear polyethylene is another type of polyethylene useful in practicing the present invention. Manufacture of linear polyethylene is disclosed, e.g., in U.S. Pat. No. 4,076,698 and involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone." Two types of linear polyethylene are also suitable for use in the present invention: linear high density polyethylene (HDPE) and linear low density polyethylene (LLDPE).

Linear high density polyethylene has a density from about 0.941 to about 0.965 g/cc while linear low density polyethylene (LLDPE) and ultra low density polyethylene (ULDPE) typically has a density from about 0.850 g/cc to about 0.940 g/cc. The density of the linear polyethylene is lowered by polymerizing ethylene with minor amounts of alpha, beta-ethylenically unsaturated alkenes (i.e., alpha-olefins) having from 3 to about 20 carbons per alkene molecule, preferably 4 to 8 (e.g., 1-butene, 4-methyl 1-pentene, 1-hexene) and most preferably 8 carbons per alkene molecule (i.e., 1-octene). The amount of the alkene comonomer is generally sufficient to cause the density of the linear low density polymer to be substantially in the same density range as LDPE, due to the alkyl side chains on the polymer molecule, yet the polymer remains in the "linear" classification. These polymers retain much of the strength, crystallinity, and toughness normally found in HDPE homopolymers of ethylene, but the higher alkene comonomers impart high "cling" and "block" characteristics to extrusion or cast films and the high "slip" characteristic inherently found in HDPE is diminished.

The use of coordination-type catalysts for polymerizing ethylene into homopolymers, either in solution or slurry type polymerization, or copolymerizing ethylene with higher alkenes to make copolymers having densities above about 0.94 g/cc as defined in ASTM D-1248 (i.e., HDPE polymers) and/or for copolymerizing ethylene with higher alkenes to make copolymers having densities in the range of LDPE and medium density polyethylene (i.e., LLDPE copolymers) is disclosed variously in, e.g., U.S. Pat. No. 2,699,457; U.S. Pat. No. 2,862,917; U.S. Pat. No. 2,905,645; U.S. Pat. No. 2,846,425; U.S. Pat. No. 3,058,963 and U.S. Pat. No. 4,076,698. Thus, the density of the linear polyethylene useful in the present invention is from about 0.88 g/cc to about 0.965 g/cc.

The molecular weight of the linear polyethylene is indicated and measured by melt index according to ASTM D-1238, Condition (E) (i.e., 190° C./2.16 kilograms). The melt index of the linear polyethylene useful in the present invention can be from about 0.001 grams/10 minutes (g/10 min) to about 1,000 g/10 min, preferably from about 0.01 g/10 min to about 100 g/10 min.

Ethylene can also be interpolymerized with substituted alpha-olefins by known techniques. The substituted alpha-olefins are a known class of polymerizable monomers that include, for example, ethylenically unsaturated carboxylic acids, esters and anhydrides (e.g., acrylic acid, methacrylic acid, maleic acid, maleic anhydride, methyl methacrylate, butyl acrylate), vinyl esters of alkanoic acids (e.g., vinyl acetate), vinyl alcohol, and the like.

Interpolymers of ethylene and at least one ethylenically unsaturated carboxylic acid are particularly useful in the present invention. Such interpolymers can be made by any of the known techniques. For example, U.S. Pat. Nos. 4,599,392 (McKinney et al.) and 4,248,990 (Pieski et al.), both of which are incorporated herein by reference, disclose processes for manufacturing random and non-random interpolymers of ethylene/acrylic acid and ethylene/methacrylic acid, respectively. The amount of unsaturated carboxylic acid can vary from 0 (i.e., LDPE) to as high as about 40%, dependent on the carboxylic acid used in the interpolymerization. Ethylene/unsaturated carboxylic acid(s) interpolymers made by use of telogenic modifiers, as disclosed in U.S. Pat. No. 4,988,781, incorporated herein by reference, are also suitable for practicing the present invention. The molecular weight of the ethylene/unsaturated carboxylic acid interpolymers is indicated by melt index and is also measured by ASTM D-1238, Condition E (i.e., 190° C./2.16 kilograms). The melt index of the ethylene/unsaturated carboxylic acid interpolymers can be from about 0.1 g/10 min to about 3000 g/10 min, preferably from about 1 g/10 min to about 300 g/10 min.

Ionomers of various interpolymers (e.g., metal ionomers of ethylene/acrylic acid or ethylene/methacrylic acid interpolymers) are also within the scope of this invention. U.S. Pat. No. 3,404,134 (Rees), incorporated herein by reference, discloses a process for cross-linking polymers thereby creating ionomers useful in the present invention. In one embodiment of the present invention, aqueous solutions of metal hydroxides (e.g., sodium hydroxide or potassium hydroxide), nitrogenous bases (e.g., ammonium hydroxide), or water-soluble strong base organic amines (e.g., mono-, di-and tri-methyl amines) can be added to a devolatilizing extruder in a first injection zone to effectively function as both a stripping agent and neutralizing/ionomerization agent. The water is subsequently stripped under vacuum thus removing residual unreacted monomer or monomers, solvent and thermally unstable species forming a more thermally stable ionomer.

Additives can be included in the thermoplastic ethylene polymers useful in practicing the present invention. These additives include pigments (e.g., titanium dioxide), wetting agents, fillers, slip, anti-block compounds and the like. Anti-oxidants can also be included in the interpolymers, but they need not be present for the present invention to be effectively used.

Solvents (or diluents) can be and generally are used in both the high pressure process (e.g., LDPE) or the low pressure process (e.g., LLDPE) to make the ethylene polymers. Some of the typical solvents used during interpolymerization include: paraffinic hydrocarbons such as pentane, hexane, heptane, cyclohexane, branched alkanes, alkenes, and alkynes (plus their various isomeric forms) and the like; or aromatic hydrocarbons such as benzene, toluene, chloro-substituted aromatic hydrocarbons such as dichlorobenzene and the like; or polar solvents such as alcohols, ethers, ketones, esters and the like; or various naphtha distillates such as those sold under the trademark ISOPAR by EXXON, or the like. These solvents are difficult to remove from the interpolymer, even after pelletization. Residual monomer (e.g., ethylene and/or acrylic acid) can also be retained in the interpolymer. Thermally unstable species (e.g., free radical species) can react with oxygen and cause taste problems. Thermally unstable species, as defined herein, are compounds which thermally degrade in the presence of oxygen at elevated temperatures (i.e., at polymer melt processing temperatures). These semi-volatile components can cause taste and/or odor problems in fabricated parts made from the interpolymers, depending on the application, and surprisingly, can also cause the interpolymer to have less oxidative thermal stability.

Removal of the residual unreacted monomer or monomers, solvent and thermally unstable species to form the oxidatively thermally stable interpolymers of the present invention is accomplished by the steps of:

(a) feeding a first ethylene polymer to an extruder which is designed to provide a first and second partially filled vacuum zones;

(b) melting the first ethylene polymer;

(c) applying more vacuum than 100 mm Hg absolute to the first partially filled vacuum zone containing at most 75 percent by volume, based on the total volume of the zone, of the molten first ethylene polymer;

(d) concurrently injecting at least 0.1 percent by weight based on total ethylene polymer feed of at least one stripping agent to a first stripping agent injection zone;

(e) mixing the at least one stripping agent with the first ethylene polymer in a first confined mixing zone;

(f) applying at least 15 mm Hg absolute more vacuum than applied in the first partially-filled vacuum zone to the second partially filled vacuum zone containing at most 75 percent by volume, based on the total volume of the zone, of the molten first ethylene polymer; and (g) recovering the second devolatilized, more oxidatively thermally stable ethylene polymer.

The devolatilization method of the invention is performed continuously on a single or twin screw extruder as shown in the examples. Other continuous devolatilization equipment includes Bolling Mixtrumat™ continuous process or Farrel Discpack™ and other types of continuous extrusion equipment may be used as long as it possible to adapt such equipment in such a manner as to provide partally filled vacuum zones and confined mixing zones.

Confined mixing zones can be created, for example, in single screw extruder by controlling the gap between the crest of a blister and the wall of the extruder barrel or in a twin extruder extruder, by use of reverse pumping elements, such that a melt seal is created during processing that has the tenacity or melt strength to resist the vapor pressure of a given stripping agent and avoid flashing of the stripping agent to the extent that effective gas bubble formation is effectuated. Higher gaps will be required for more viscous polymers, while narrower gaps will be required for low viscous polymer. For 60 mm single screw extruder, for example, blister diameter will be between about 59 mm and 56 mm.

A particularly effective embodiment for forming more thermally stable interpolymers of the present invention comprises the injection of a stripping agent into a devolatilizing extruder. The stripping agents useful in the present invention are inert with respect to the interpolymerization process. The stripping agent(s) should have a vapor pressure sufficient to either be a gas or form gas bubbles at the devolatilizing operating conditions (i.e., when the interpolymer is molten). Preferably, the stripping agent(s) is a light hydrocarbon (e.g., ethylene, propylene or isobutane), water, aqueous solutions of metal hydroxides, nitrogenous bases (e.g., ammonium hydroxide), water-soluble organic strong base organic amines (e.g., mono-, di-and tri-methyl amines), steam, alcohol, carbon dioxide and/or nitrogen. Super critical fluids are also useful as stripping agents for use in the present invention. Alkali metal hydroxide solutions, nitrogenous bases, water-soluble organic strong base organic amines are particularly effective when simulataneously devolatilizing ethylene/unsaturated carboxylic acid interpolymers while forming the corresponding ionomer. Mixtures of stripping agents are also useful in the present invention. The stripping agent should be used in amounts effective to remove enough residual unreacted monomer(s), solvent and stripping agent(s) such that the oxidative exotherm of the interpolymer is reduced by at least 50 percent.

The devolatilization of the interpolymers is preferably performed using a single or twin screw system with water injection as described in U.S. Pat. No. 4,094,942, with the added feature of using a screw which has a surface renewal ratio of at least about about two pounds per square meter or less, preferably about one pound per square meter or less. When creating a more thermally stable interpolymer made using a high pressure process (e.g., LDPE or ethylene/acrylic acid interpolymers) and the devolatilizing screw is installed in-line with the process (i.e., before the pelletization step), the extruder(s) vacuum devolatilization zone(s) should be partially-filled (i.e., the flow of the interpolymer is restricted such that the channels of the screw in the vacuum zone are partially-filled; this can be accomplished, e.g., using a device which controls/restricts flow, such as a slide valve or a gear pump). The extruder comprises an optional stripping agent injection zone, an optional confined mixing zone, at least a first partially filled vacuum zone, at least a first stripping agent injection zone, at least one first confined mixing zone, and at least a second partially filled vacuum zone. Preferably, a vacuum of about 100 mm Hg absolute or less is applied to the first vacuum zone, at least one inert stripping agent is cocurrently injected at a concentration of at least about 0.1 percent by weight based on total interpolymer feed to the first stripping agent zone, and a vacuum of about 5 mm Hg absolute or less is applied to the second vacuum zone. The stripping agent should form small gas bubbles when in the vacuum zone to effectively strip the interpolymer of volatiles thereby forming the more oxidatively thermally stable interpolymer.

The screw channels of the vacuum zone should be partially filled with the stripping agent/polymer mix, creating frequent polymer surface renewal (i.e., a relatively low specific surface renewal ratio, measured in pounds of polymer per square meter of surface) which is exposed to the vacuum. Partially filling each vacuum zone of the extruder such that each vacuum zone has a specific surface renewal ratio of about two pounds per square meter or less, preferably about one pound per square meter or less, is especially effective when used in a devolatilizing extruder vacuum zone.

Partially filling the channels can be controlled in different ways, including modifying the geometry of the vacuum zone. This can be accomplished by increasing flight depth, and/or by simultaneously increasing flight pitch while increasing the number of flight starts (i.e., using a multi-start screw design in the region of vacuum).

The stripping agent/polymer mix should be confined to adequately mix the stripping agent with the polymer. Confinement of the stripping agent/polymer mix can be accomplished using various means, such as by using melt seals (i.e., blisters) on single or twin screw extruder systems, reverse flights on a twin screw extruder system, by incorporating high pressure compression zones along the screw, or by using axial, radial, and/or trans-axial throttle valves on single or twin screw extruder systems.

To be effective in the present invention, the devolatilization method used should remove enough residual unreacted monomer(s), solvent, thermally unstable species and stripping agent(s) from the polymer such that the oxidative exotherm of the interpolymer is reduced by at least 50 percent.

The more oxidatively thermally stable polymers produced by the present invention are useful in a variety of thermal forming processes, including molding techniques (e.g., injection molding, rotomolding and blow molding), film forming techniques (e.g., cast, blown and extrusion coating) and fiber forming techniques. The oxidatively thermally stable polymers have particular utility when they are used in a food package.

Comparative Examples 1–3 and Example 4

An ethylene/acrylic acid interpolymer having a melt index of about 10 grams/10 minutes and about 10% by weight of interpolymer of acrylic acid is made according to the technique described in U.S. Pat. No. 4,599,392, incorporated herein by reference. This interpolymer is pelletized for later use in a stripping experiment.

The stripping experiment is performed by feeding ethylene/acrylic acid interpolymer pellets into a first 90 mm single screw extruder having a length/diameter (L/D) ratio of 25 at a rate of about 350 pounds/hour (160 kg/hour). The temperature profile of this screw is set to the conditions outlined in Table 1.

TABLE 1

| Extrusion Conditions for the First Screw | |
|---|---|
| Extruder Zone 1 (°C.) | 220 |
| Extruder Zone 2 (°C.) | 220 |
| Transfer Line (°C.) | 220 |
| Melt Temp. (°C.) | 210 |
| Extruder rpm | 95 |
| Ethylene injection (weight percent, based on polymer fed) | 0.2 |

The molten ethylene/acrylic acid interpolymer is conveyed to a second 90 mm single screw extruder having a 40 L/D operated according to the temperature profile described in Table 2:

TABLE 2

| Extrusion Conditions for the Second Screw | |
|---|---|
| Extruder Zone 1 (°C.) | 220 |
| Extruder Zone 2 (°C.) | 220 |
| Water Injection Zone 1 (weight percent) | 0.5 |
| Melt Temp. (°C.) | 220 |
| Water Injection Zone 2 (weight percent) | 0.5 |
| Extruder rpm | 130 |
| Vacuum Zone 1 (mm Hg) | 45 (60 mbars) |
| Vacuum Zone 2 (mm Hg) | 30 (40 mbars) |

The screws are operating at differing speeds in order that the devolatilizing screw is only partially filled. The second screw is equipped with two injection ports and two vacuum ports along its length, as shown in FIG. 1. Each injection section of the screw itself is equipped with two melt seals (i.e., a "blister" or restrictor ring) to confine the mixing zone. The melt seals confine the stripping agent to the area of the mixing zone to ensure that the stripping agent and the interpolymer are well mixed prior to devolatilization.

The interpolymer is extruded through the system described above, with varying degrees of stripping and devolatilization. Table 3 describes these differences:

TABLE 3

| Example | Interpolymer processing description |
|---|---|
| 1* | Base interpolymer without further processing |
| 2* | Extruded interpolymer without stripping or vacuum |
| 3* | Extruded interpolymer with vacuum only |
| 4 | Extruded interpolymer with ethylene injection, dual water stripping injection and dual vacuum zones |

*Comparison example only, not an example of the invention.

Differential Scanning Calorimetry (DSC)

Differential scanning calorimetry (DSC) analysis is used to determine the thermal activity of resin samples in the presence of oxygen. For each sample, a known amount of resin (approximately 5 milligram) is placed in a very small glass ampule. The bottom of the glass ampule is cooled with liquid nitrogen and the top of the ampule is sealed. The sealed ampule containing the resin sample is placed in the DSC sample chamber at room temperature. The DSC sample and reference chambers are then heated at a constant rate (10° C. per minute) to a final temperature of about 300°0 C. The thermal activity of the sample resin is continuously monitored versus the reference. The reference is an empty glass ampule. The thermal activity (i.e. exotherm) of the resin sample up to 300° C. is calculated in terms of joules per gram.

Solvent Analysis

Residual solvent concentrations in the resin samples were determined using multiple headspace gas chromatography. The procedure used is as follows. For each sample, a known amount of resin (approximately 0.5 gram) was placed in a septum sealed vial. The sample vial was then placed on an automated headspace analyzer connected to a gas chromatograph. The sample vial was then analyzed using a quantitative multiple headspace extraction procedure. The concentration of the residual solvent in the sample vial was determined from the quantitative analysis of known solvent standards analyzed under identical multiple headspace extraction conditions.

Residual Comonomer Analysis

Residual Comonomer concentrations in the resin samples is determined using a solvent extraction procedure followed by high performance liquid chromatography (HPLC) analysis. For each sample, a known amount of resin (approximately 0.5 grams) was placed in container along with 75 ml of a xylene/butanol (at a 3:1 ratio) extraction solvent. The container is sealed and heated for 4 hours at 160° F. The container is allowed to cool and the extraction solvent is analyzed using HPLC. In the case of acrylic acid, the concentration of residual acrylic acid in the sample is determined from the quantitative analysis of known acrylic acid standards.

Table 4 summarizes the melt index, total volatiles content and oxidative exotherm data of the interpolymer after treatment according to the trials outlined in Table 3. For Comparative Examples 1–3 and Example 4, the maximum oxidative exotherm occurs at about 240° C. Ethylene is not detected in any of the samples, either prior to or after extrusion. The residual monomer for this experiment is acrylic acid.

TABLE 4

| Example | Melt Index (gms/10 min) | Total Volatiles (ppm) | Oxidative Exotherm (Joules/gm) | Percent Oxidative Exotherm Reduction |
|---|---|---|---|---|
| 1* | 11.2 | 950 | 27 | NA |
| 2* | 10.8 | 490 | 19 | 29.6% |
| 3* | 11.1 | 293 | 21 | 22.2% |
| 4 | 10.9 | 45 | 10 | 73% |

*Comparison example only, not an example of the invention.
NA = Not Applicable.

Table 5 lists the components of the total volatiles for the four interpolymers tested after the interpolymer sample is strand chopped and sealed for later analysis:

TABLE 5

| Example Example | Residual Monomer and Solvent Level (ppm) | | |
|---|---|---|---|
| | Total | Unreacted monomer | Solvent |
| 1* | 950 | 320 | 630 |
| 2* | ND | ND | 490 |
| 3* | 293 | 113 | 180 |
| 4 | 45 | 35 | 10 |

Comparative example only, not an example of the invention; ND=Not Determined

Comparative Examples 5–7 and Example 8

An ethylene/acrylic acid interpolymer having a melt index of about 10 grams/10 minutes and about 9.7% by weight of interpolymer of acrylic acid is made according to the technique described in U.S. Pat. No. 4,599,392, incorporated herein by reference. This interpolymer is pelletized for later use in the following stripping experiment.

The ethylene/acrylic acid interpolymer pellets are gravity fed into a co-rotating 90 mm twin screw extruder having a 33 L/D at a rate of about 2000 pounds/hour (908 kg/hour). The temperature profile of this screw is set to the conditions outlined in Table 6:

TABLE 6

| Extrusion Conditions | |
|---|---|
| Thermocouple 29 (°C.) | 112 |
| Thermocouple 30 (°C.) | 240 |
| Thermocouple 31 (°C.) | 200 |
| Thermocouple 32 (°C.) | 200 |
| Thermocouple 33 (°C.) | 200 |
| Thermocouple 34 (°C.) | 200 |
| Thermocouple 35 (°C.) | 200 |
| Melt Temp/Thermocouple 36 (°C.) | 210 |
| Extruder rpm | 300 |
| Water Injection Zone 1 (weight percent) | 0.5% |
| Water Injection Zone 2 (weight percent) | 0.5% |

TABLE 6-continued

| Extrusion Conditions | |
| --- | --- |
| Vacuum 1 (mm Hg) | 56 (75 mbars) |
| Vacuum 2 (mm Hg) | 38 (50 mbars) |

The twin screw is equipped with two injection ports and two vacuum ports along its length, as shown in FIG. 2. The first injection section of the screw itself is equipped with two melt seals (i.e., blisters) to confine the mixing zone. The second injection section has a melt seal up-stream of the vacuum port to prevent the stripping agent from premature devolatilization. The melt seals confine the stripping agent to the area of the mixing zone to ensure that the stripping agent and the interpolymer are well mixed prior to devolatilization.

The interpolymer is extruded through the system described above using a weigh belt feeder (not shown in FIG. 2) to ensure that the extruder is partially filled. Table 7 describes processing differences for the extruded resins:

TABLE 7

| Interpolymer | Resin processing description |
| --- | --- |
| 5* | Base resin without further processing |
| 6* | Extruded resin without stripping or vacuum |
| 7* | Extruded resin with vacuum only |
| 8 | Extruded resin with dual water stripping injection and dual vacuum zones |

*Comparison example only, not an example of the invention.

Table 8 summarizes the melt index, total volatiles content and oxidative exotherm data of the interpolymer after treatment according to the trials outlined in Table 7.

TABLE 8

| Example | Melt Index (gms/10 min) | Total Volatiles (ppm) | Exotherm (Joules/gm) | Percent Oxidative Exotherm Reduction |
| --- | --- | --- | --- | --- |
| 5* | 10.3 | 950 | 27 | NA |
| 6* | 10.2 | 520 | 27 | 0% |
| 7* | 10 | 440 | 16 | 40.7% |
| 8 | 9.8 | 200 | 8 | 70.3% |

*Comparison example only, not an example of the invention.
NA = Not Applicable.

Table 9 lists the components of the total volatiles for the four interpolymers tested:

TABLE 9

| | Volatiles (ppm) | | |
| --- | --- | --- | --- |
| Example | Total | Unreacted monomer | Solvent |
| 5* | 950 | 320 | 630 |
| 6* | ND | ND | 520 |
| 7* | 440 | 180 | 260 |
| 8 | 200 | 100 | 100 |

Comparative example only, not an example of the invention; ND=Not Determined

The resultant interpolymers from trials 5*, 6*, 7* and 8 are each extrusion coated onto paper roll stock at a thickness of about 1 mil on a Black Clawson Extrusion Coater and monitored for performance. The Extrusion Coater has a 30:1 L/D ratio, a 3.5 inch diameter screw and a 30 inch coathanger die. The processing temperature is about 550° F. and the screw speed is about 85 revolutions per minute (RPM). The chill roll is operated at about 440 feet per minute for the neck-in determinations. To determine maximum line speed, the chill roll speed is increased until the web begins to nip on each side of the die. Data for these tests appears in Table 10:

TABLE 10

| Interpolymer from example | Neck-in | Maximum Line Speed (feet/min) | |
| --- | --- | --- | --- |
| number | (inches) | Side 1 | Side 2 |
| 5* | 1.875 | 1000 | 1200 |
| 6* | 1.625 | 900 | 900 |
| 7* | 1.875 | 1000 | 1000 |
| 8 | 1.875 | 1100 | 1250 |

*Comparison example only, not an example of the invention.

-- These data show that interpolymers processed according to the present invention exhibit equivalent if not superior neck-in and line-speed performance to that of the base interpolymer.

Film Fabrication Procedure for Taste and Odor Evaluations

Cast films are prepared from Example 5* and from Example 8. The cast films are prepared on a small cast film unit. The extruder has a 1 ½ inch diameter screw and a 20:1 L/D. The cast film unit is equipped with a 12 inch slot die. The films are fabricated at a temperature of 550° F. The fabrication conditions used result in one mil (0.001 inch) cast films.

Odor Evaluation Procedure

For each sample, 10 grams of cast film is placed in 16 ounce glass containers. These containers are sealed and placed in an oven at 60° C. for 16 hours. The samples are removed and allowed to cool. The headspace odor in the samples is then compared using a group of test panelists. The panelists are asked to choose the sample which was preferred (i.e. preference) and the results recorded.

Taste Evaluation Procedure

For each sample, 20 grams of cast film is placed in a glass container with 800 milliliters of drinking water. The containers are then sealed and placed in an oven set at 60° C. for 16 hours. The samples are then removed and allowed to cool. The water from each sample is divided into aliquots and tasted by the test panelists. The panelists are asked to choose the sample which was preferred (i.e. preference) and the results recorded.

Taste and Odor Results

The taste and odor results from the evaluation of the cast films are summarized in Tables 11 and 12, respectively.

TABLE 11

| Cast Film | Taste Results | |
|---|---|---|
| | Number of Panelists | Percent Preference |
| Example 5* (Control Sample) | 6 | 27% |
| Example 8 (Vacuum Devolatilized Sample) | 16 | 73% |

Total number of panelists = 22

TABLE 12

| Odor Results Cast Film | Number of Panelists | Percent Preference |
|---|---|---|
| Example 5* (Control Sample) | 6 | 30% |
| Example 8 (Vacuum Devolatilized Sample) | 14 | 70% |

Total number of panelists = 20

What is claimed is:

1. A method of improving the taste and odor properties and the oxidative thermal stability of a first thermoplastic ethylene polymer, comprising removing residual unreacted monomer or monomers, solvent and thermally unstable species from said ethylene polymer, thereby forming a second more oxidatively thermally stable ethylene polymer having an oxidative exotherm of not more than about 50 percent of the oxidative exotherm of the first polymer, as measured by differential scanning calorimetry, the method comprising:

(a) feeding the thermoplastic ethylene polymer into a devolatilization extrusion system having at least two vacuum zones and at least one barrel, the at least one barrel having
      i. a first vacuum zone,
      ii. at least one stripping agent injection port,
      iii. at least one confined mixing zone, and
      iv. a second vacuum zone,
   wherein the at least one confined mixing zone is situated immediately downstream of the at least one stripping agent injection port the second vacuum zone is situated downstream of the first vacuum zone, and the first vacuum zone is designed to operate partially-filled with polymer;

(b) conveying the polymer through the extrusion system;
   (c) applying vacuum to the first vacuum zone:
   (d) concurrently injecting at least about 0.1 percent by weight based on total thermoplastic ethylene polymer feed of at least one inert stripping agent to at least one stripping agent port;
   (e) mixing the polymer and the inert stripping agent in the at least one confined mixing zone:
   (f) applying vacuum to the second vacuum zone; and
   (g) recovering the extruded ethylene polymer.

2. The method of claim 1 wherein step (a) immediately follows an interpolymerization reaction of ethylene with at least one other comonomer.

3. The method of claim 1 wherein step (a) immediately follows an interpolymerization reaction of ethylene with acrylic or methacrylic acid.

4. The method of claim 1 wherein each vacuum zone of the extruder has a specific surface renewal ratio of about two pounds per square meter or less.

5. The method of claim 1 wherein the extruder has a specific surface renewal ratio of about one pound per square meter or less.

6. The method of claim 1 wherein the stripping agent is a $C_2$–$C_{18}$ hydrocarbon, methane, water, aqueous solutions of metal hydroxides, steam, alcohol, carbon dioxide and/or nitrogen.

7. The method of claim 1 wherein the stripping agent is chosen from the group consisting of aqueous solutions of metal hydroxides, nitrogenous bases and water-soluble organic strong base organic amines.

8. The method of claim 1 wherein the stripping agent is an aqueous solution of sodium hydroxide, thereby forming a more oxidatively thermally stable ionomer.

9. The method of claim 1 wherein the polymer is molten when entering the first vacuum zone.

10. The method of claim 1 wherein a gear pump is located at the downstream end of the extruder barrel to maintain a constant feed pressure out of the extruder.

11. The method of claim 1 wherein the root of the extruder auger increases at the end of the extruder barrel to increase pressure on the polymer.

12. The method of claim 1 wherein the first ethylene polymer is low density polyethylene.

13. The method of claim 1 wherein the first ethylene polymer is linear polyethylene.

14. The method of claim 13 wherein the linear polyethylene is linear low density polyethylene.

15. The method of claim 13 wherein the linear polyethylene is ultra low density polyethylene.

16. The method of claim 1 wherein the first ethylene polymer is an interpolymer of ethylene and an unsaturated carboxylic acid.

17. The method of claim 16 wherein the first ethylene polymer is an interpolymer of ethylene and acrylic acid.

18. The method of claim 16 wherein the first ethylene polymer is an interpolymer of ethylene and methacrylic acid.

19. The method of claim 1 wherein the extruder immediately follows a homopolymerization reaction of ethylene.

20. The ionomer produced by the method of claim 8.

21. The ethylene/acrylic acid interpolymer produced by the method of claim 17.

22. The ethylene/methacrylic acid interpolymer produced by the method of claim 18.

23. A multilayered film structure having an inner layer and an outer layer, at least one layer of which comprises the interpolymer of claim 15.

24. A multilayered film structure having an inner layer and an outer layer, at least one layer of which comprises the interpolymer of claim 17.

25. A multilayered film structure having an inner layer and an outer layer, at least one layer of which comprises the interpolymer of claim 18.

26. The multilayered film structure of claim 23 wherein the structure is used in food products wraps, beverage containers or condiment pouches.

27. The multilayered film structure of claim 24 wherein the structure is used in food products wraps, beverage containers or condiment pouches.

28. The multilayered film structure of claim 25 wherein the structure is used in food products wraps, beverage containers or condiment pouches.

* * * * *